UNITED STATES PATENT OFFICE.

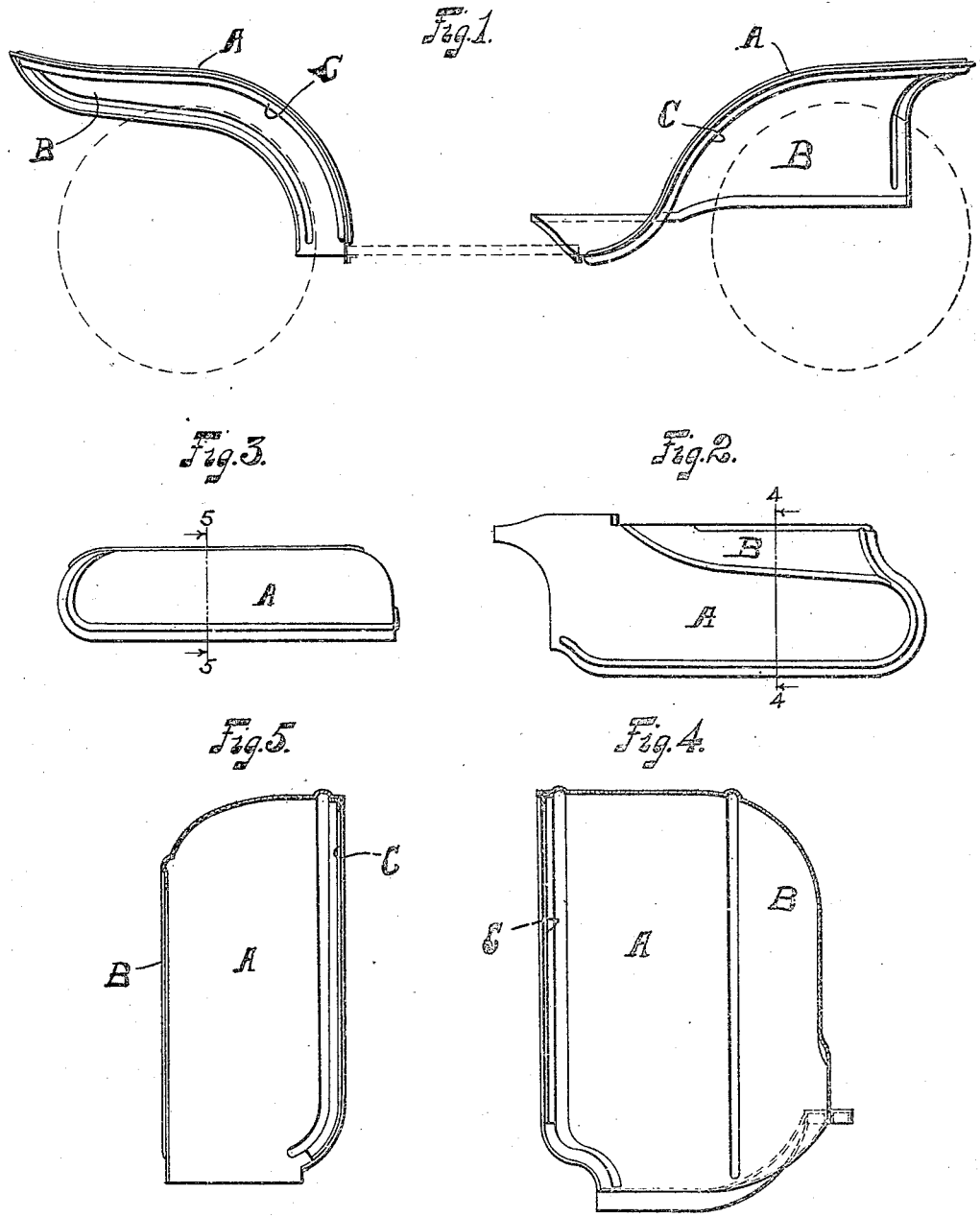

ROBERT JARDINE, OF CLEVELAND, OHIO.

FENDER FOR AUTOMOBILES.

958,132. Specification of Letters Patent. Patented May 17, 1910.

Application filed November 7, 1906. Serial No. 342,315.

*To all whom it may concern:*

Be it known that I, ROBERT JARDINE, a citizen of the United States, resident of Cleveland, county of Cuyahoga, and State of Ohio, have invented a new and useful Improvement in Fenders for Automobiles, of which the following is a specification, the principle of the invention being herein explained and the best mode in which I have contemplated applying that principle so as to distinguish it from other inventions.

My invention relates to the art of vehicle construction and particularly to the construction of the fenders or mud guards used to protect the occupants of vehicles from the dust and dirt flung up by the wheels. The problem of thus adequately protecting the occupants of a vehicle has become of more than ordinary importance in the case of automobile designing; for, due to the broad tires used on their wheels and the relatively high speeds at which they are driven, motor-cars are apt to deluge their drivers with mud or else stifle them with dust, according to the state of the roadway they chance to be traveling.

The object of this, my present invention, is to provide a fender that by its conformation and construction will be unusually efficient in the particular noted and that, at the same time, will present the desirable characteristics of durability and lightness.

Said invention, then, consists of means hereinafter fully described and particularly pointed out in the claims.

The annexed drawing and the following description set forth in detail certain means embodying the invention, such disclosed means constituting but one of various forms in which the principle of the invention may be used.

In said annexed drawing: Figure 1 represents a side elevation of an automobile with front and rear fenders of the improved type, comprehended by my invention secured in place, the automobile being represented in diagrammatic fashion only; Figs. 2 and 3 are plan views of such front and rear fenders, respectively, shown as being detached from the automobile; Fig. 4 is a vertical transverse cross-section of the front fender taken on the line 4—4, Fig. 2; while Fig. 5 is a similar cross-section of the rear fender taken on the line 5—5, Fig. 3, both Figs. 4 and 5 being on a larger scale than the other figures.

In designing a fender for the wheels of an automobile, not only must the wheels be covered but provision must be made in the case of the front wheels to give them ample clearance as they assume different angular positions about the steering knuckles on which they are pivotally mounted. This is obviously rather difficult to do without making the fender unduly wide. A recent attempt to solve the problem has been to give the fender a decided outward flare, whereby it was thought the mud or dust would be deflected sufficiently to protect the passengers in the car. As a matter of fact, however, it has been found that such dirt, after escaping from the fender, is very apt to be swirled inwardly onto the passengers by the currents of air set up by the moving vehicle or else by the wind, so as to make the fender in question only a partial and imperfect means of protection. For obvious reasons, it should be added, it is impracticable to completely inclose the upper portion of the wheel. Such a fender would have to be substantially hemispherical in shape and would further prevent ready access to the wheel for the purpose of cleaning the same, removing or detaching the tire, and the like. I shall now proceed to indicate the manner in which I successfully overcome these several difficulties.

An inspection of the various figures of the drawing will readily disclose that my improved fender, whether for front or rear wheel, comprises essentially a section A that is curved to conform with the periphery of such wheel. Such section is disposed to cover the upper portion of the wheel, the rear upper portion in the case of the front wheel and the front upper portion in the case of the rear wheel. The manner in which such fender section is attached to the vehicle frame is a matter of indifference, so far as this invention is concerned, and may vary with the material of which the fender is composed. The material, while preferably sheet metal, may be wood, ore fiber, or leather, which last-named would involve the use of an iron frame-work to support it.

Continuous with the inner edge of section A is a second section B disposed to more or less completely inclose the inner side of the wheel-portion covered by section A. Along the forward and outer edge of this same section A and on its under face is mounted a flange or rib C, the height of which may vary but is preferably approximately that shown in the figures of the drawing relatively to the dimensions of the other parts of the fender.

It is to the two features of construction last described that I here desire to call attention. In the first place, fender section B, by its form and disposition, is adapted to prevent the spattering of mud on the body of the machine, which is objectionable both because of the immediate injury to the paint on such body and because of the difficulty with which it can be removed. Furthermore, a goodly portion of the mud or dust thus escaping from the fender is carried directly back onto those seated in the machine by the current of air set up by the latter's rapid motion. Such escape of dirt by the outer edge of the fender is, in the second place, quite as effectually prevented by rib or flange C; for as it flies off the wheel it is of course first caught by the broad under-surface of section A, as in the ordinary fender. In spite, however, of its impact, which ordinarily serves to carry it over the fender's edge to be swirled back upon the carriage, section B on the inner, and rib C on the outer, side of the fender retain it all until it drops directly down onto the ground again.

It might here be added that the prevention of the escape of mud and dust by the outer edge of the fender is of even more importance to the comfort of pedestrians who are so unfortunate as to be in the vicinity of a passing car on a muddy road or street, than to that of the occupants of the car. With the present style of fender, particularly the outwardly flaring kind, such pedestrians and even people in vehicles are liable to be spattered by a careless chauffeur. The rib C furthermore serves to materially reinforce the outer edge of the fender which is not only susceptible to damage by colliding with objects in the way but is liable, unless made of heavy stock, to flap and work loose, due to the jolting to which it is subjected. I am thus enabled to make my improved fender of considerably lighter material than has hitherto been possible and that, too, without leaving it flimsy or unstable in the least.

Having thus described my invention in detail, that which I particularly point out and distinctly claim, is:—

1. A fender for a vehicle-wheel comprising a cylindrical section disposed to conform with the periphery of such wheel and disposed to cover the upper portion of the same, a section continuous with the inner edge of said first-named section and disposed to inclose the inner side of such wheel-portion, and a flange or rib along the forward and outer edge on the underside of said first-named section, said section being so disposed and the width of said rib being so gaged as to place the latter without the periphery of the wheel altogether.

2. A fender for the front wheel of an automobile or the like, such fender comprising a substantially cylindrical section disposed to aline with the periphery of said wheel when in its normal position, a section of substantially spherical conformation disposed to inclose the inner side of said wheel while permitting movement of said wheel from its normal position, and an angle bar secured along the edge on the under side of said cylindrical portion, the downturned tongue of such bar forming a rib and said cylindrical portion being disposed to support such rib wholly without the periphery of such wheel.

Signed by me, this 5th day of November, 1906.

ROBERT JARDINE.

Attested by—
  D. T. DAVIES,
  JNO. F. OBERLIN.